United States Patent
Yamamoto

(10) Patent No.: US 11,354,525 B2
(45) Date of Patent: Jun. 7, 2022

(54) OPTICAL INFORMATION READER MANUALLY HANDLED BY USERS

(71) Applicant: DENSO WAVE INCORPORATED, Chita-gun (JP)

(72) Inventor: Kenryo Yamamoto, Takahama (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 388 days.

(21) Appl. No.: 15/140,774

(22) Filed: Apr. 28, 2016

(65) Prior Publication Data

US 2016/0321484 A1    Nov. 3, 2016

(30) Foreign Application Priority Data

Apr. 28, 2015   (JP) .............................. JP2015-091426
Apr. 27, 2016   (JP) .............................. JP2016-089564

(51) Int. Cl.
*G06K 7/10*   (2006.01)

(52) U.S. Cl.
CPC ..... *G06K 7/10732* (2013.01); *G06K 7/10821* (2013.01); *G06K 7/10881* (2013.01); *G06K 2207/1011* (2013.01)

(58) Field of Classification Search
CPC .......... G06K 7/10594; G06K 7/10831; G06K 7/10881; G06K 2207/1011; G06K 7/10732; G06K 7/10821
See application file for complete search history.

(56) References Cited

U.S. PATENT DOCUMENTS

| | | | |
|---|---|---|---|
| 5,262,627 A | 11/1993 | Shepard | |
| 5,489,770 A | 2/1996 | Kadota et al. | |
| 5,656,803 A | 8/1997 | Seo | |
| 5,852,288 A | 12/1998 | Nakazawa et al. | |
| 6,073,852 A * | 6/2000 | Seo | G06K 7/10881 235/454 |
| 2004/0007621 A1 * | 1/2004 | Okada | G06K 7/10722 235/454 |
| 2009/0012806 A1 * | 1/2009 | Ricordi | G06F 3/03545 705/16 |

FOREIGN PATENT DOCUMENTS

| | | |
|---|---|---|
| CN | 1077297 A | 10/1993 |
| JP | H05242279 A | 9/1993 |
| JP | H08-212278 A | 8/1996 |
| JP | H08-227437 A | 9/1996 |
| JP | 2002-117370 A | 4/2002 |
| JP | 2014-85684 A | 5/2014 |
| TW | 200931324 A | 7/2009 |

* cited by examiner

*Primary Examiner* — Th M Le
*Assistant Examiner* — Tae W Kim
(74) *Attorney, Agent, or Firm* — Oliff PLC

(57) ABSTRACT

An optical information reader includes a main body portion in which a reading opening is formed; and a grip portion that is connected to a section of the main body portion other than a section in which the reading opening is formed, and is gripped by a user. The reader further includes a light-receiving sensor that captures an image of a predetermined imaging area AR through the reading opening; and a control circuit that performs an interpreting process of a code image of an information code imaged by the light-receiving sensor. An extending portion that extends towards the information code side is provided in a periphery of the reading opening. An opened portion is formed in a section of the extending portion other than a section on the grip portion side.

13 Claims, 14 Drawing Sheets

FIG.5
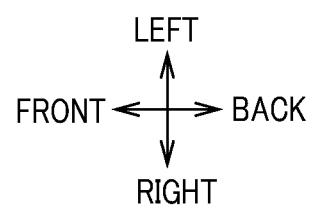
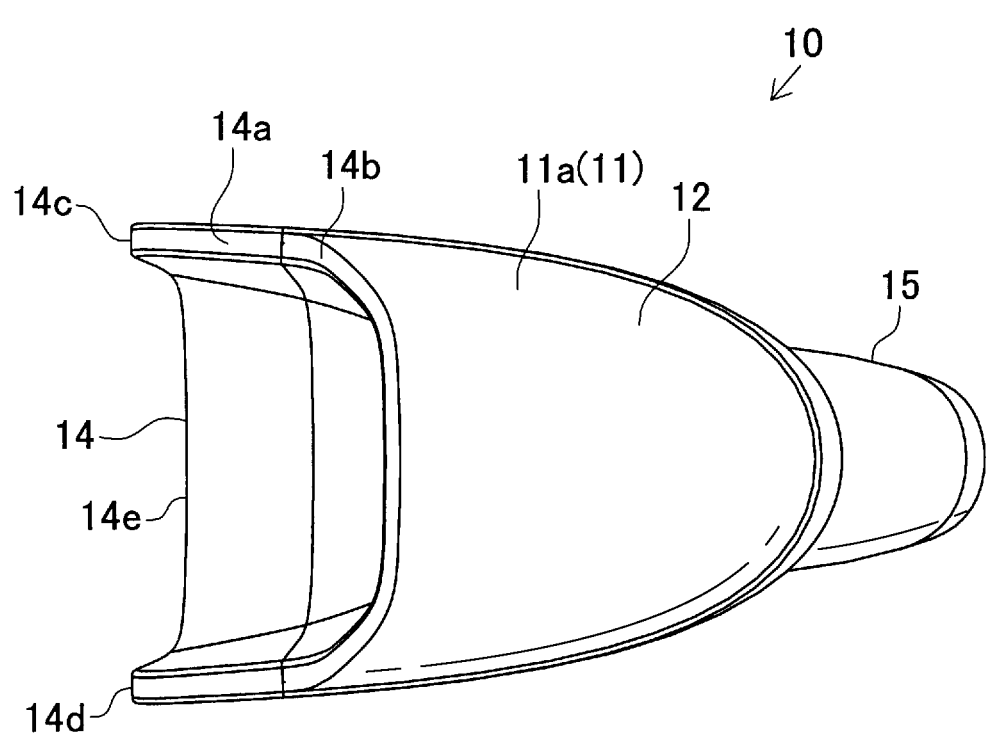

FIG.13
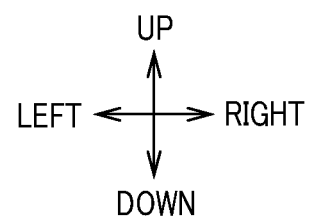
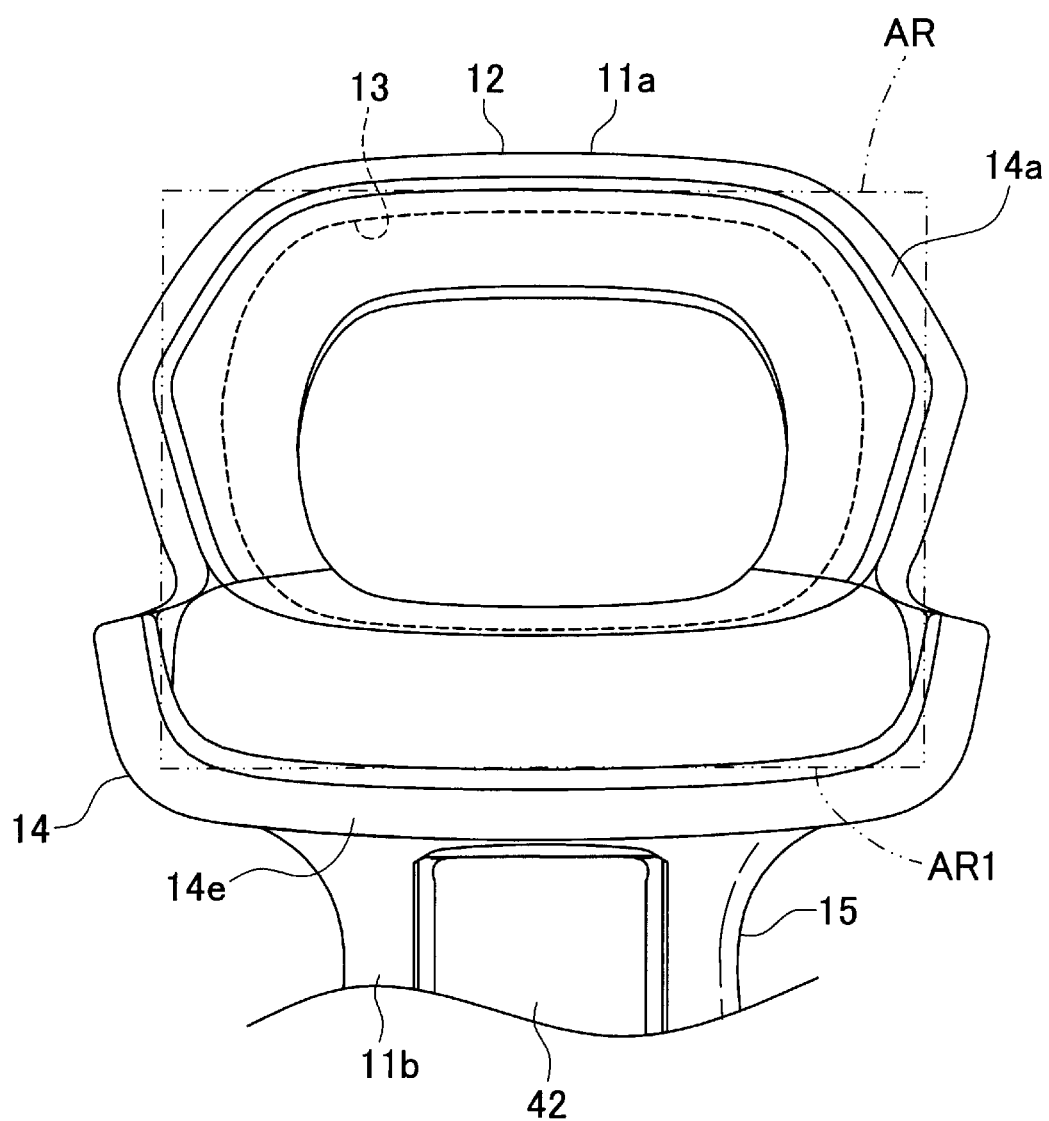

OPTICAL INFORMATION READER MANUALLY HANDLED BY USERS

CROSS-REFERENCE TO RELATED APPLICATION

This application is based on and claims the benefit of priority from earlier Japanese Patent Application No. 2015-091426 filed Apr. 28, 2015 and No. 2016-089564 filed Apr. 27, 2016 the description of which are incorporated herein by reference.

BACKGROUND OF THE INVENTION

Technical Field

The present invention relates to an optical information reader that optically reads an information code, such as a barcode, and in particular, to an optical information reader manually handled by users.

Related Art

Optical information readers that optically read information from information codes, such as barcodes, are now being widely used in a diverse range of fields, such as the manufacturing industry. In the case of such optical information readers, a reading operation is often performed in a state in which a reading opening and a desired information code are placed in proximity, so that information provided by the information code can be reliably read. For example, a barcode attached to a product may be read through use of a portable-type reader that is provided in a cash register of a store. In such cases, the barcode to be read is read in a state in which the barcode is placed in contact with the reading opening of the reader. As a result, reading of a barcode or the like other than the barcode to be read is prevented. Here, a reading operation of an information code attached to an object that is too large to be lifted by hand, for example, is performed with a certain amount of distance between the information code and the reader.

However, in a reader such as that described above, a user may not be able to see the information code as a result of the information code becoming hidden behind the reader when the reading opening is placed in contact with or close to the information code, or the product or the like to which the information code is attached. Consequently, the user of the reader may not be able to ascertain the position of the information code in relation to the reading opening. A reliable reading process may not be performed. In particular, when a two-dimensional code is to be read, the reading process becomes a failure, should only a portion of the two-dimensional code be imaged as a result of the reading opening not facing the two-dimensional code at an appropriate position.

Therefore, to solve issues such as those above, for example, a configuration such as that of a data symbol reader, disclosed in JP-A-H09-326004, can be considered. The data symbol reader 1 has a casing that is composed of a grip portion and a head portion. The head portion has a housing that is composed of side walls. In addition, the side wall is composed of a transparent, plate-shaped optical component. An optical thin film that selectively reflects illumination light from a light source is provided on the back surface of the side wall.

However, in the reader such as that in JP-A-H09-326004, at least a portion of the housing is configured to be both a window portion for viewing the information code and a component for reflecting light from the information code and guiding the reflected light to a light-collection optical system. Therefore, the range of choices regarding the shape, material, and the like of such a section (side wall) configuring the window portion for viewing is limited. This configuration leads to a more complicated structure of the reader. Repair is required when the side wall is damaged.

SUMMARY

In consideration of the foregoing, it is thus desired to provide a configuration that enables an information code to be viewed during a reading operation, without use of a component that is composed with a specific shape, material, and the like.

According to an exemplary embodiment, there is provided an optical information reader (or optical information reading apparatus). The reader includes: a main body portion that includes a reading opening through which illumination light and reflected light of the illumination light are transmitted; a grip portion that is rigidly connected to a section of the main body portion other than a section in which the reading opening is formed, and is gripped by a user; an imaging unit that optically captures an image of a predetermined imaging area through the reading opening; and an interpreting unit that performs an information code interpreting process based on the image of the imaging area captured by the imaging unit. The optical information reader is characterized in that: an extending portion that extends towards a reading side of the reading opening is provided in a periphery of the reading opening; and the extending portion has an opened portion that is formed by being cut out, at least partially, from a tip end portion of the extending portion and allows a line-of-sight of the user to pass through the opened portion.

In the invention according to the first aspect, the extending portion that extends towards the front (that is, a direction toward an information code which is present in front of the reader when being used) is provided in the periphery of the reading opening. By way of example, the opened portion is configured such that an opening is formed in the section of the extending portion other than the grip portion side, by a portion of the extending portion being cut out from the tip end thereof. Therefore, even when the reading opening is placed near an information code when the information code is being read, the information code can be viewed through a gap formed by the opened portion of the extending portion. As a result, the user of the reader is able to confirm the position of the information code through the gap formed by the opened portion of the extending portion, from a side of the main body portion opposite the grip portion side. The user is more easily able to place the information code in a desired position that facilitates reading, in relation to the reading opening. In addition, a configuration such as this can be actualized without use of a specific shape or a specific material in the extending portion. Increase in the number of components can be suppressed, and simplification of the structure of the reader can be achieved.

BRIEF DESCRIPTION OF THE DRAWINGS

In the accompanying drawings:

FIG. 5 is a planar view of the optical information reader in FIG. 1;

FIG. 13 is a front view schematically showing a portion of an optical information reader according to another embodiment of the present invention and having a configuration differing from the configuration in FIG. 12;

DETAILED DESCRIPTION OF THE PREFERRED EMBODIMENTS

First Embodiment

A first embodiment specifying an optical information reader (or an optical information reading apparatus) of the present invention will now be described with reference to FIG. 1 to FIG. 11.

Figure 7:
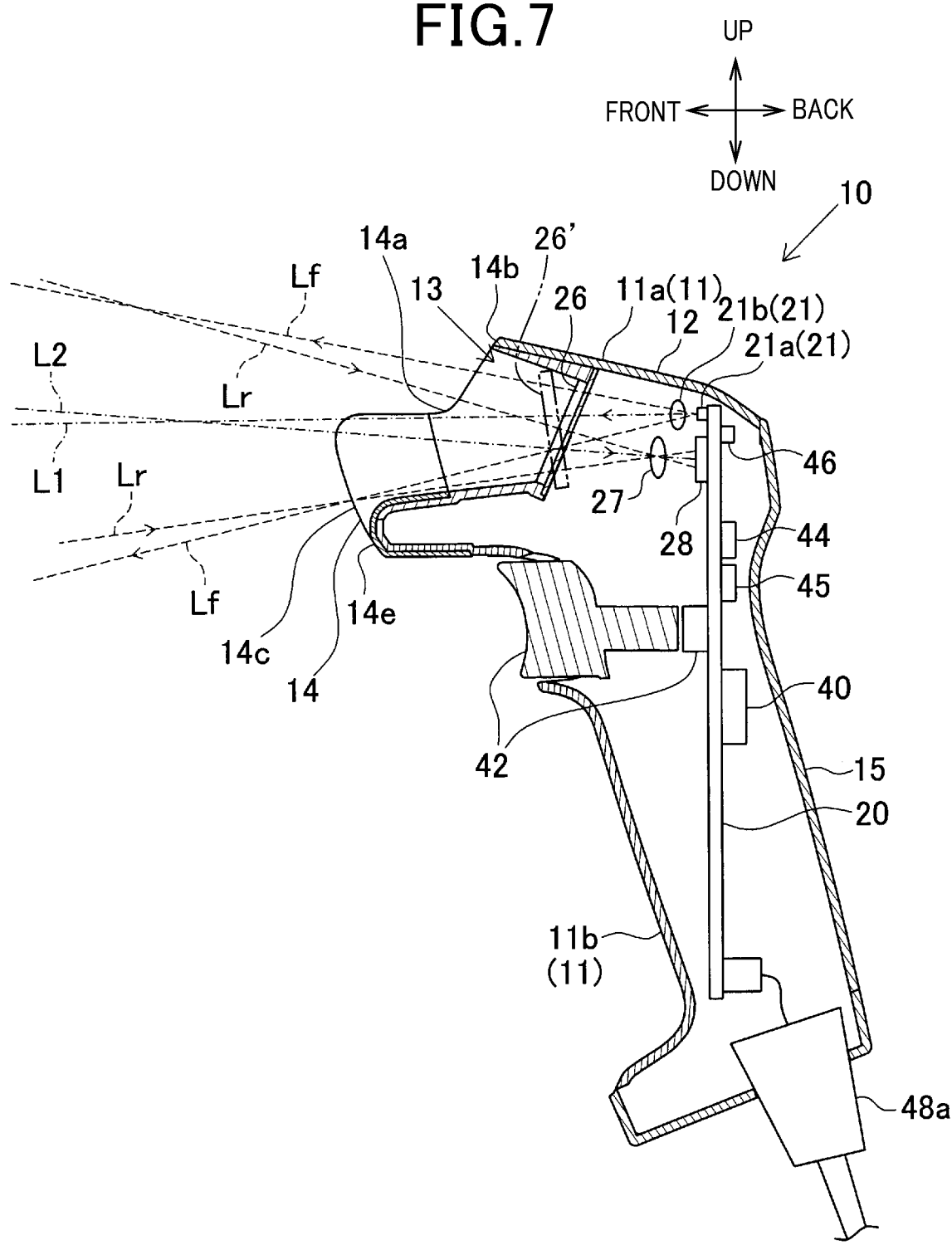
FIG. 7 is a cross-sectional view showing an overview of an internal configuration of the optical information reader in FIG. 1, together with a partial configuration of a variation example.
Figure 8:
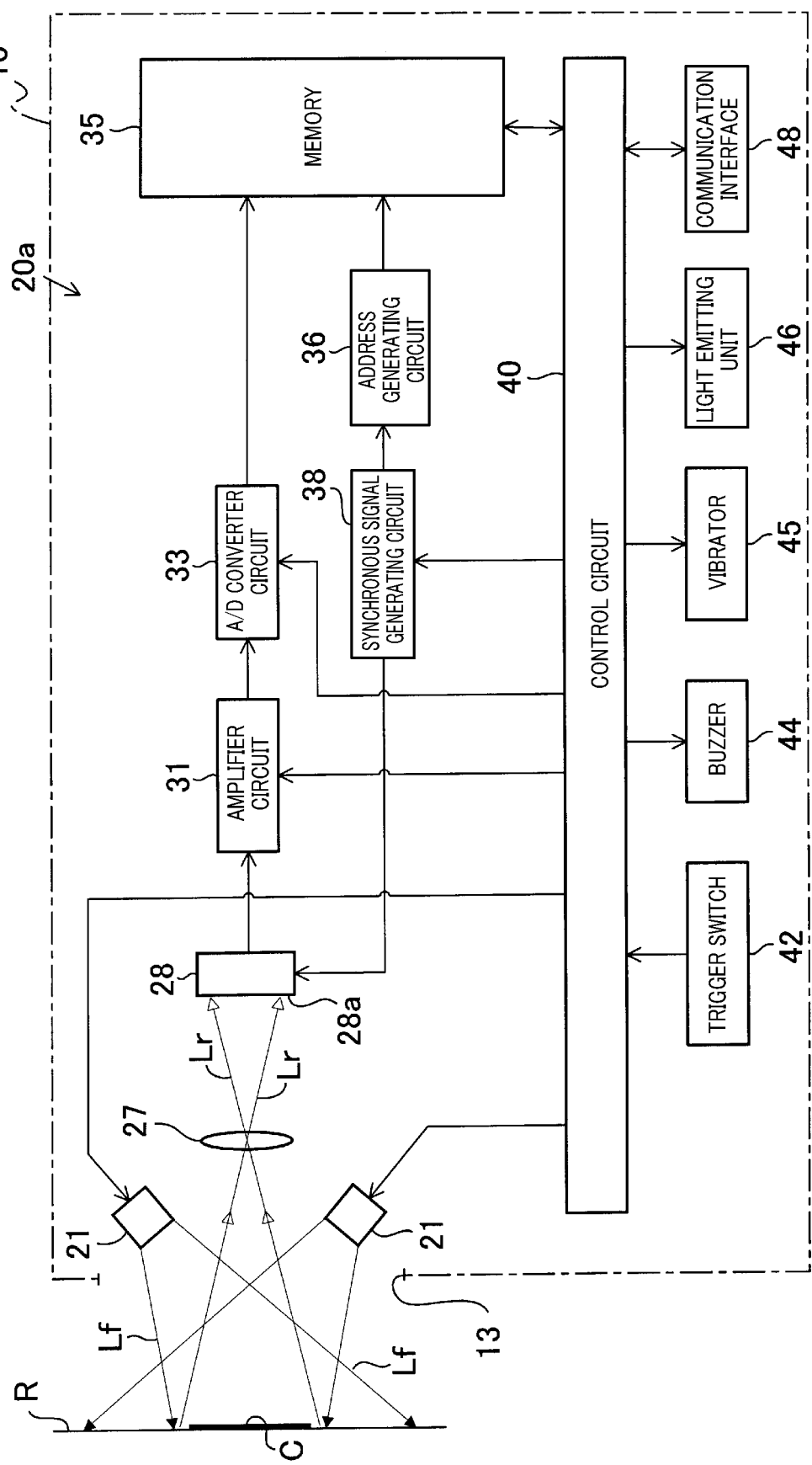
FIG. 8 is a block diagram of an example of an electrical configuration of the optical information reader in FIG. 1.
Figure 10:
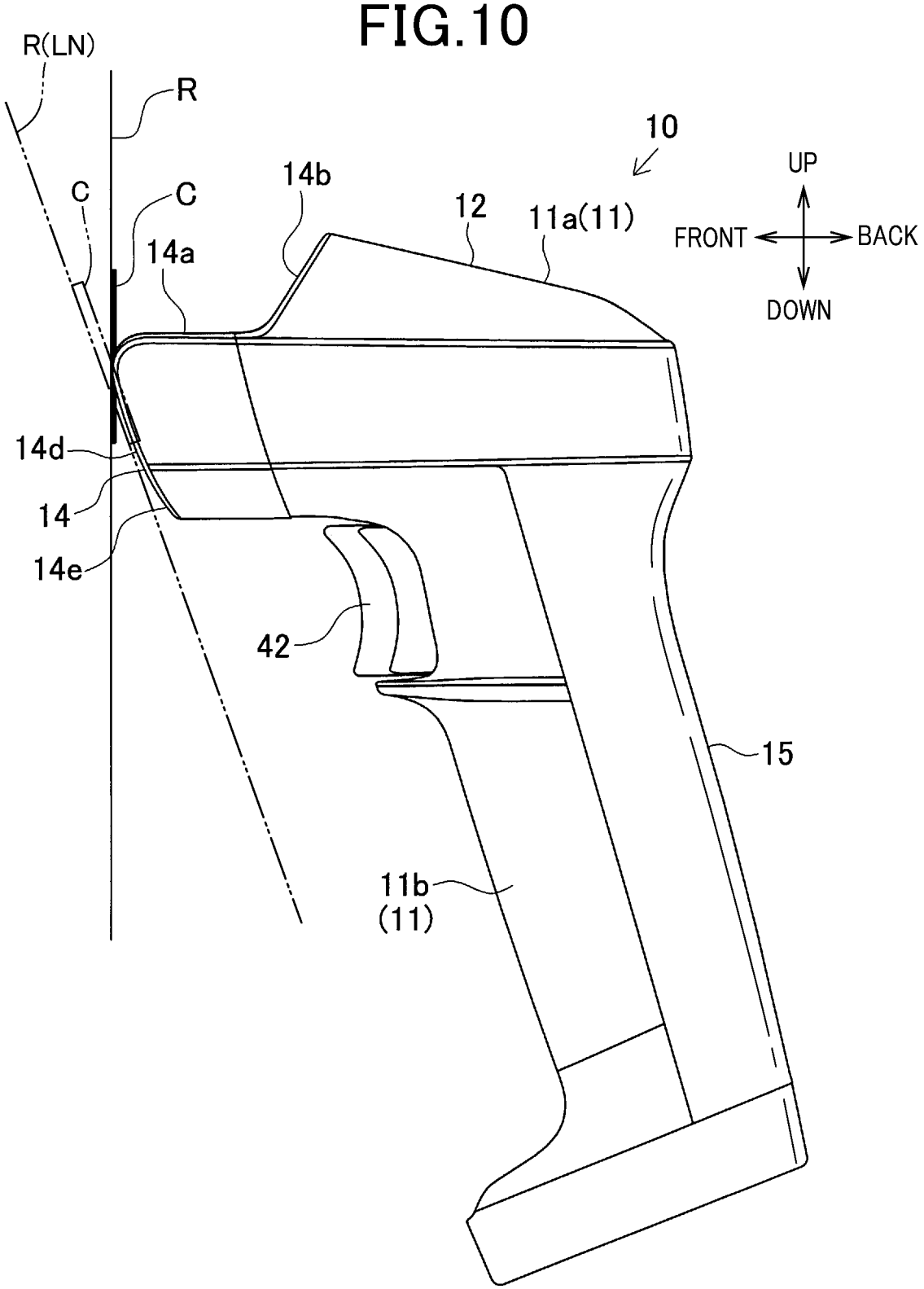
FIG. 10 is a right-side view for explaining a state in which an information code formed on a display medium is read by the optical information reader in FIG. 1.

An optical information reader 10 (also referred to, hereafter, as simply a reader 10) according to the present embodiment is configured as a code reader that optically reads an information code C (see FIGS. 8 and 10). The information code C is a one-dimensional code, a two-dimensional code, or the like. The outer appearance of the reader 10 is as shown in FIG. 1 to FIG. 7. A circuit portion 20a is mounted on a circuit board 20 or the like, and housed inside a case 11. The circuit portion 20a is composed of various electronic components and the like. In addition, the case 11 is composed of a first case 11a and a second case 11b that are molded members composed of a synthetic resin, such as acrylonitrile butadiene styrene (ABS) resin. The reader 10 shown in FIG. 1 to FIG. 7 is configured as a so-called gun type reader. The reader 10 includes a main body portion 12 and a substantially cylindrical grip portion 15. A reading optically-opened portion 13, which is optically opened for reading an information code, is formed in an end portion of the main body portion 12. Hereinafter, the reading optically-opened portion 13 is referred to as the reading opening 13. An illumination light beam and reflected light thereof pass through the reading opening 13. The grip portion 15 is rigidly joined to the main body portion 12 in a section differing from the section in which the reading opening 13 is formed. The grip portion 15 is gripped by a user.

Furthermore, a cylindrical extending portion 14 is provided in the periphery of the reading opening 13 of the main body portion 12. The extending portion 14 is provided such as to extend from a wall portion that forms the periphery of the reading opening 13, towards the front of the main body portion 12. A cross-section of the extending portion 14 that intersects the extending direction (front/back direction) thereof is substantially rectangular. When the reader 10 is in use, a tip end portion of the extending portion 14 faces the information code C, as shown in FIG. 10. In addition, the grip portion 15 is configured such as to extend in a longitudinal manner from a wall portion on the underside of the main body portion 12. A trigger operating portion 42 (trigger switch) that can be press-operated is disposed near an upper end portion of the grip portion 15. A cable 48a for interfacing is assembled near a lower end portion of the grip portion 15.

Next, an electrical configuration of the reader 10 will be described with reference to the drawings.

As shown in FIG. 8, the circuit portion 20a that is housed inside the above-described housing mainly includes an optical system and a microcomputer system. The optical system includes an illumination light source 21, a light-receiving sensor 28, an imaging lens 27, and the like. The microcomputer system includes a memory 35, a control circuit 40, and the like.

The optical system is divided into a light-projection optical system and a light-reception optical system. As shown in FIG. 7, the illumination light source 21 that configures the light-projection optical system functions as an illuminating means that is capable of emitting an illumination light Lf. For example, the illumination light source 21 is composed of a red-colored light-emitting diode (LED) 21a and a lens 21b provided on an emission side of the LED 21a. As indicated by an illumination optical axis L1 shown in FIG. 7, the illumination light source 21 is arranged so as to irradiate the illumination light Lf at an angle in relation to an imaging optical axis L2.

The light-reception optical system is composed of the light-receiving sensor 28, the imaging lens 27, a reflective mirror (not shown), and the like. For example, the light-receiving sensor 28 is configured as an area sensor in which light-receiving elements are arrayed in a two-dimensional manner. The light-receiving elements are solid-state image sensors, such as complementary metal-oxide-semiconductor (CMOS) image sensors or charge-coupled device (CCD) image sensors. The light-receiving sensor 28 has a light-receiving surface as a square-shaped, light-receiving area 28a. The light-receiving sensor 28 is mounted on the circuit board 20 so as to be capable of receiving incident light that enters via the reading opening 13, a protective plate 26, and the imaging lens 27. The light-receiving sensor 28 functions to capture an image of a predetermined imaging area. The light-receiving sensor 28 corresponds to an example of an "imaging unit". The imaging lens 27 functions as an imaging optical system capable of collecting incident light that has entered through the reading opening 13 from outside, and forming an image on the light-receiving surface of the light-receiving sensor 28. According to the present embodiment, the illumination light Lf radiated from the illumination light source 21 is reflected by the information code C formed on a display medium R. Subsequently, reflected light Lr is collected by the imaging lens 27, and a code image is formed on the light-receiving surface of the light-receiving sensor 28.

The microcomputer system is configured by an amplifier circuit 31, an analog-to-digital (A/D) converter circuit 33, the memory 35, an address generating circuit 36, a synchronous signal generating circuit 38, the control circuit 40, the trigger switch 42, a buzzer 44, a vibrator 45, a light emitting unit 46, a communication interface 48, and the like. As the naming "microcomputer system" implies, the microcomputer system is mainly configured by the control circuit 40 that is able to function as a microcomputer (information processing unit) and the memory 35. The microcomputer system is able to perform signal processing, by hardware or software, of image signals of an information code imaged by the above-described optical system.

The image signal (analog signal) outputted from the light-receiving sensor 28 of the optical system is inputted to the amplifier circuit 31 and thereby amplified with a predetermined gain. Subsequently, the amplified image signal is inputted to the A/D converter circuit 33 and converted from an analog signal to a digital signal. Then, the digitalized image signal, that is, image data (image information) is inputted to the memory 35 and collected in an image data collection area. The synchronous signal generating circuit 38 is capable of generating a synchronous signal for the light-receiving sensor 28 and the address generating circuit 36. In addition, the address generating circuit 36 is capable of generating a storage address of the image data stored in the memory 35, based on the synchronous signal provided by the synchronous signal generating circuit 38.

The memory 35 is a semiconductor memory device. For example, the memory 35 is a random access memory (RAM) (such as a dynamic random access memory [DRAM] or a static random access memory [SRAM]) and a read-only memory (ROM) (such as an erasable programmable read-only memory [EPROM] or an electrically erasable programmable read-only memory [EEPROM]). Of the memory 35, the RAM is configured such that, in addition to the above-described image data collection area, a work area and a reading condition table are also able to be secured therein. The work area is used during processes such as arithmetic operations and logical operations. In addition, the ROM is able to store in advance therein, a system program enabling control of hardware such as the illumination light source 21 and the light-receiving sensor 28.

The control circuit 40 is a microcomputer that is capable of controlling the overall reader 10. The control circuit 40 is composed of a central processing unit (CPU), a system bus, an input/output interface, and the like. The control circuit 40 is capable of configuring the information processing unit together with the memory 35, and also provides an information processing function. The control circuit 40 is capable of connecting to various input and output apparatuses (peripheral apparatuses) via an internal input/output interface. According to the present embodiment, the trigger switch 42, the buzzer 44, the vibrator 45, the light emitting unit 46, the communication interface 48, and the like are connected to the control circuit 40. As a result, the control circuit 40 performs, for example, monitoring and management of the trigger switch 42, ON/OFF of the sounding of the buzzer 44, drive control of the vibrator 45, ON/OFF of the illumination of the light emitting unit 46, and communication control of the communication interface 48. The buzzer 44 is capable of generating a beeping sound or an alarm sound. The vibrator 45 is capable of generating vibrations that can be transmitted to the user of the reader 10. The communication interface 48 enables communication with an external apparatus.

The control circuit 40 corresponds to an example of an "interpreting unit". The control unit 40 functions to perform an interpreting process of a code image of an information code imaged by the light-receiving sensor 28.

Next, configurations of the reading opening 13 and the extending portion 14 of the reader 10 will be described in detail.

Figure 2:
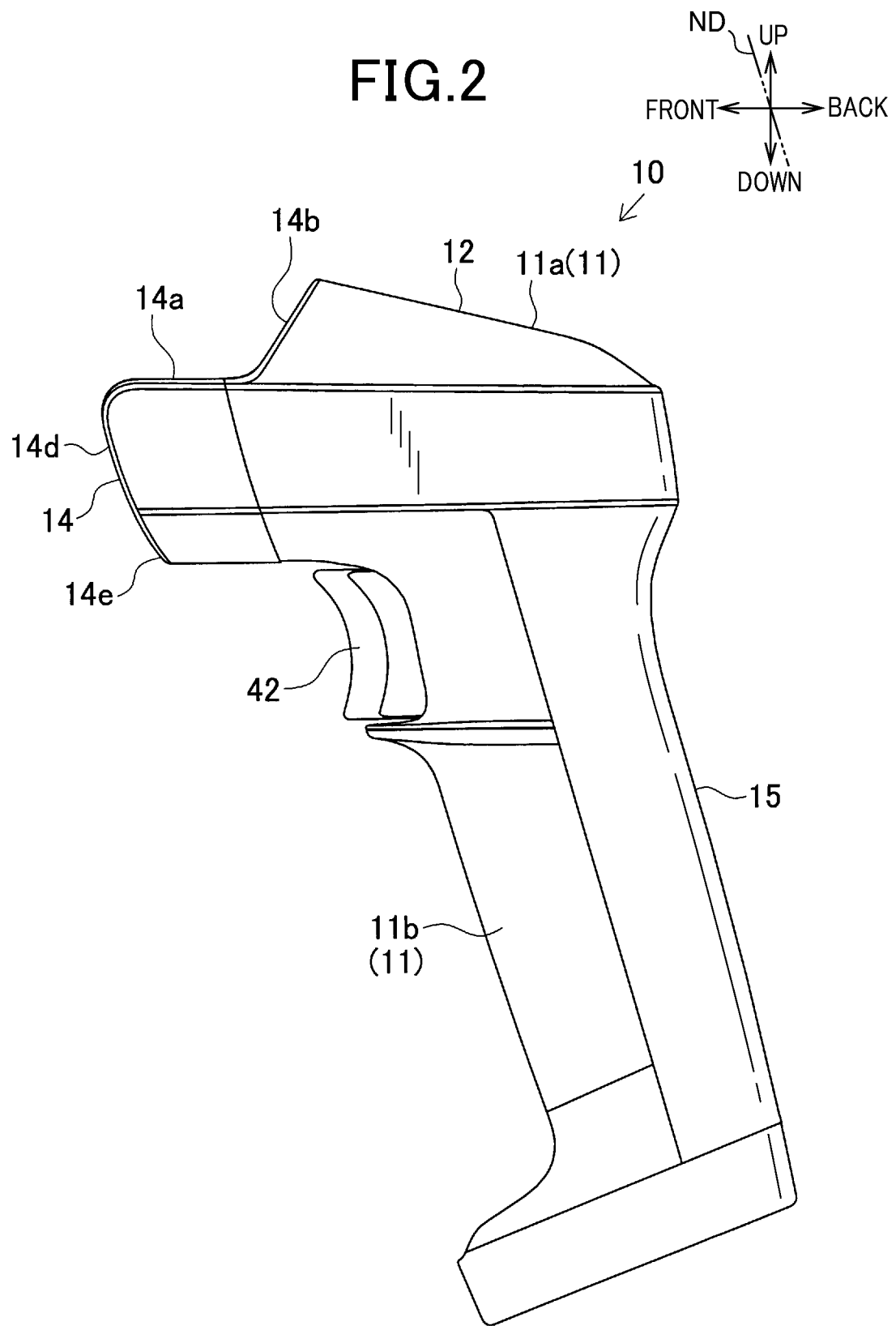
FIG. 2 is a right-side view of the optical information reader in FIG. 1.

According to the present embodiment, a direction that substantially runs along a longitudinal direction ND (for example, see FIG. 2) is an up/down direction. The longitudinal direction ND is the direction in which the substantially cylindrical grip portion 15 extends. The main body portion 12 side of the grip portion 15 is an upper side. The opposite side of the grip portion 15 is a lower side. In addition, a direction perpendicular to or intersecting with the up/down direction is a front/back direction. The side of the grip portion 15 on which the trigger switch 42 is provided is a front side. The side behind the front side of the grip portion 15 is a back side. In particular, the front of the extending portion 14 in the front/back direction is referred to as a reading side or simply the front. In addition, a direction (left/right direction in FIG. 3) perpendicular to the up/down direction and the front/back direction is a left/right direction (width direction). The left-hand side when the reader 10 is viewed from the front side is a left side, and the right-hand side is a right side. As indicated in FIG. 2, the longitudinal direction ND of the grip portion 15 is tilted in relation to the direction in which the main body portion 12 extends. Therefore, the above-described up/down direction and the front/back direction are merely introduced for convenience of description.

Figure 1:
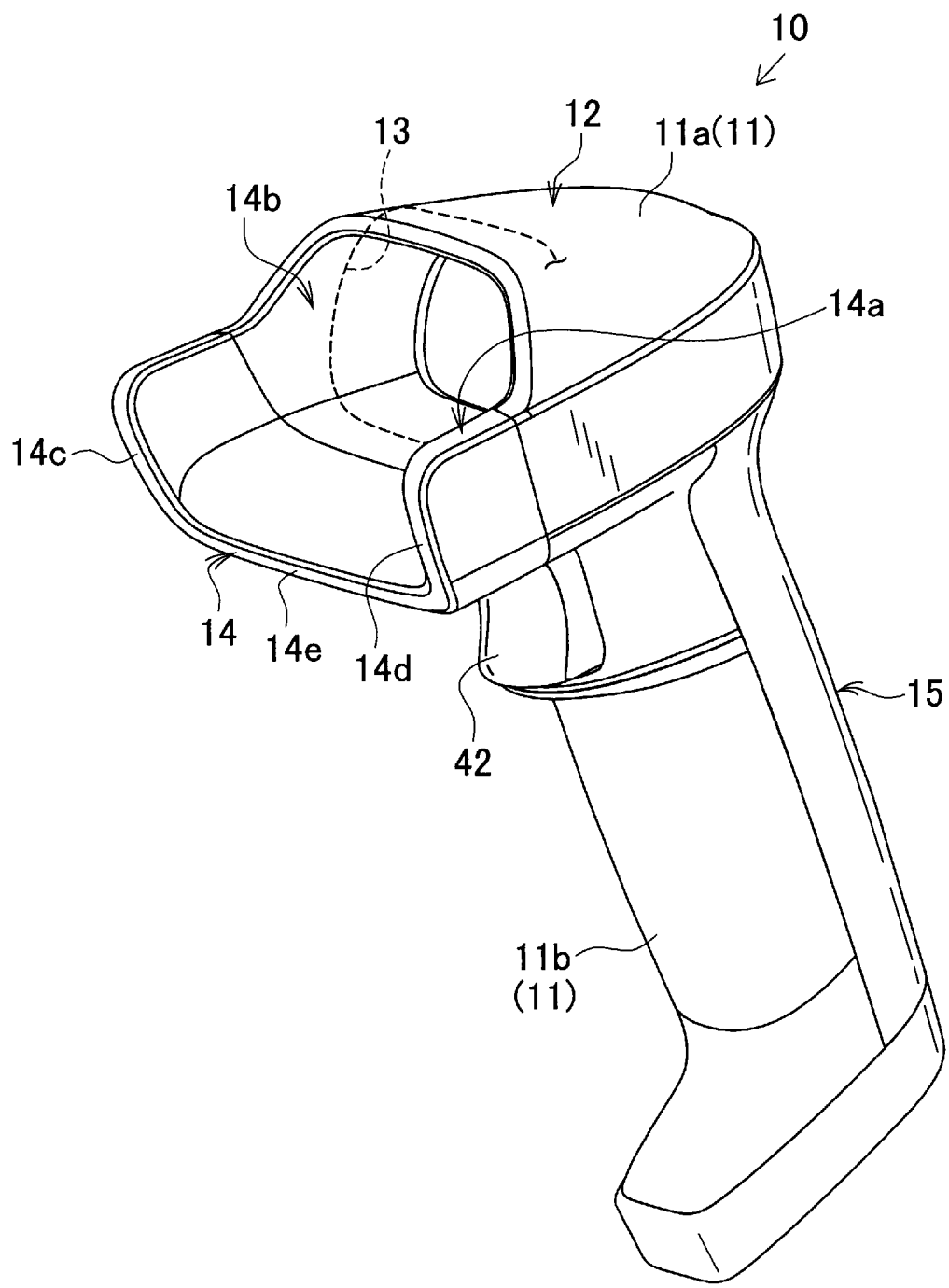
FIG. 1 is a perspective view schematically showing an optical information reader according to a first embodiment of the present invention, viewed from an upper right side.
Figure 3:
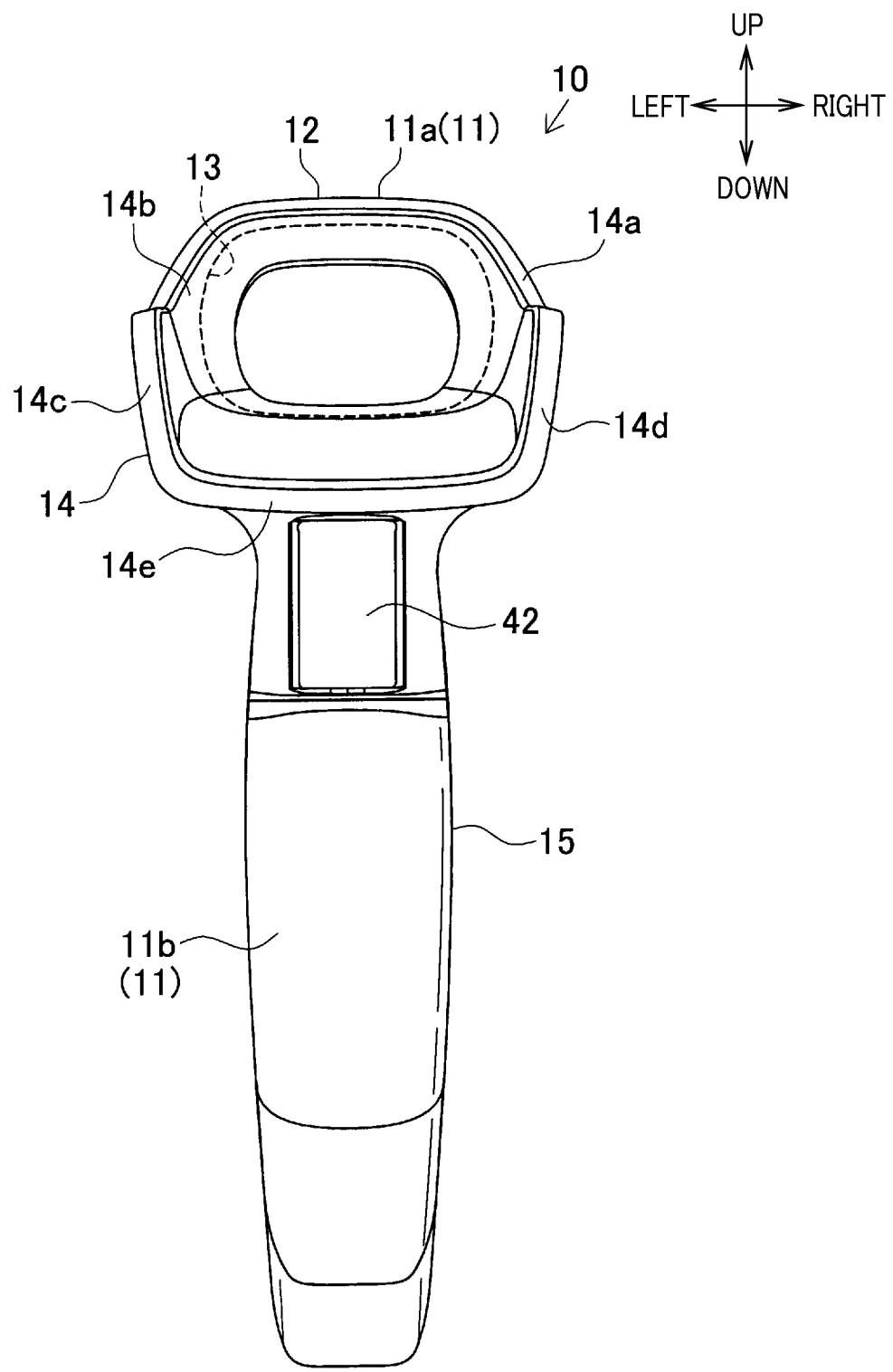
FIG. 3 is a front view of the optical information reader in FIG. 1.
Figure 4:
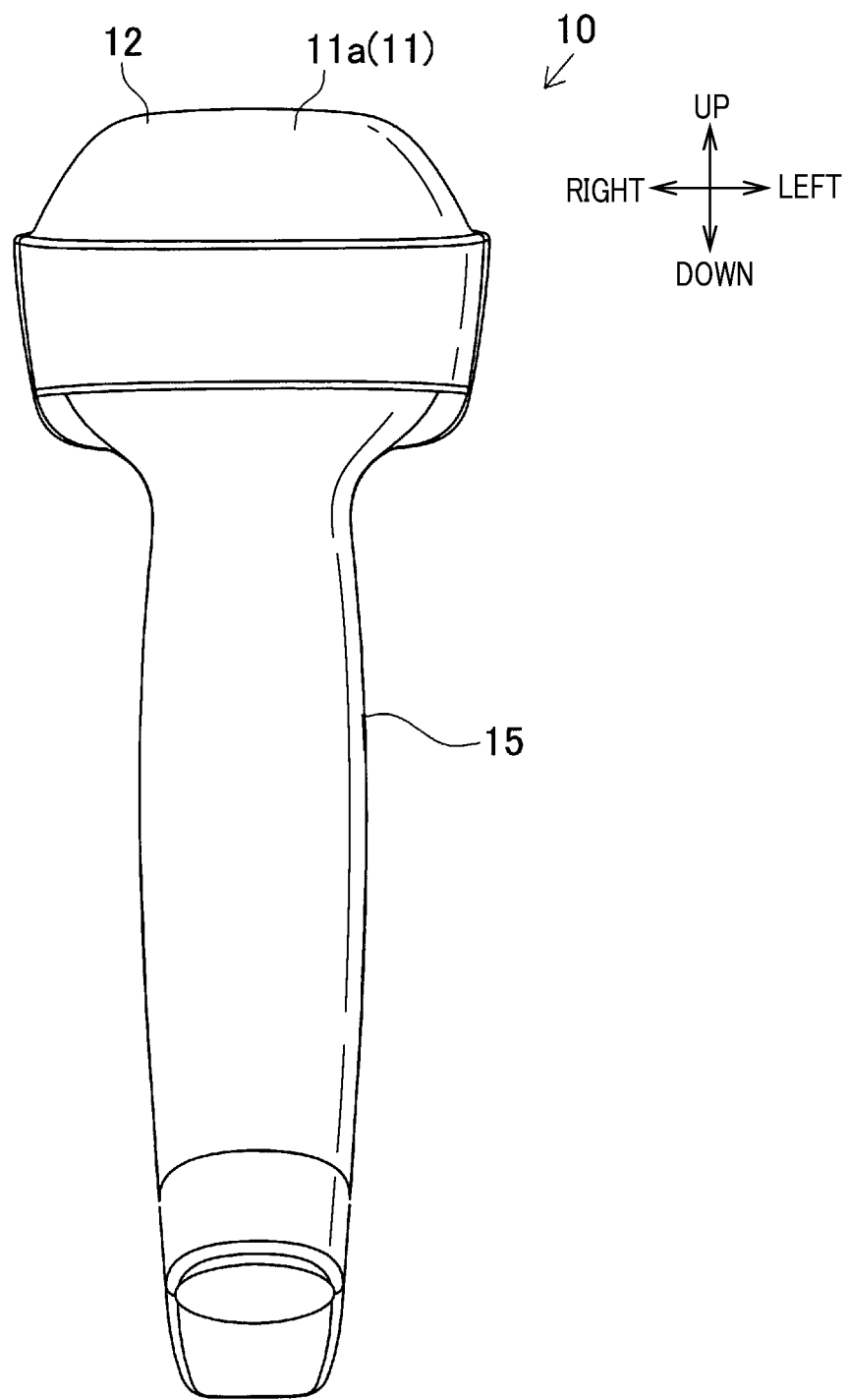
FIG. 4 is a rear view of the optical information reader in FIG. 1.
Figure 6:
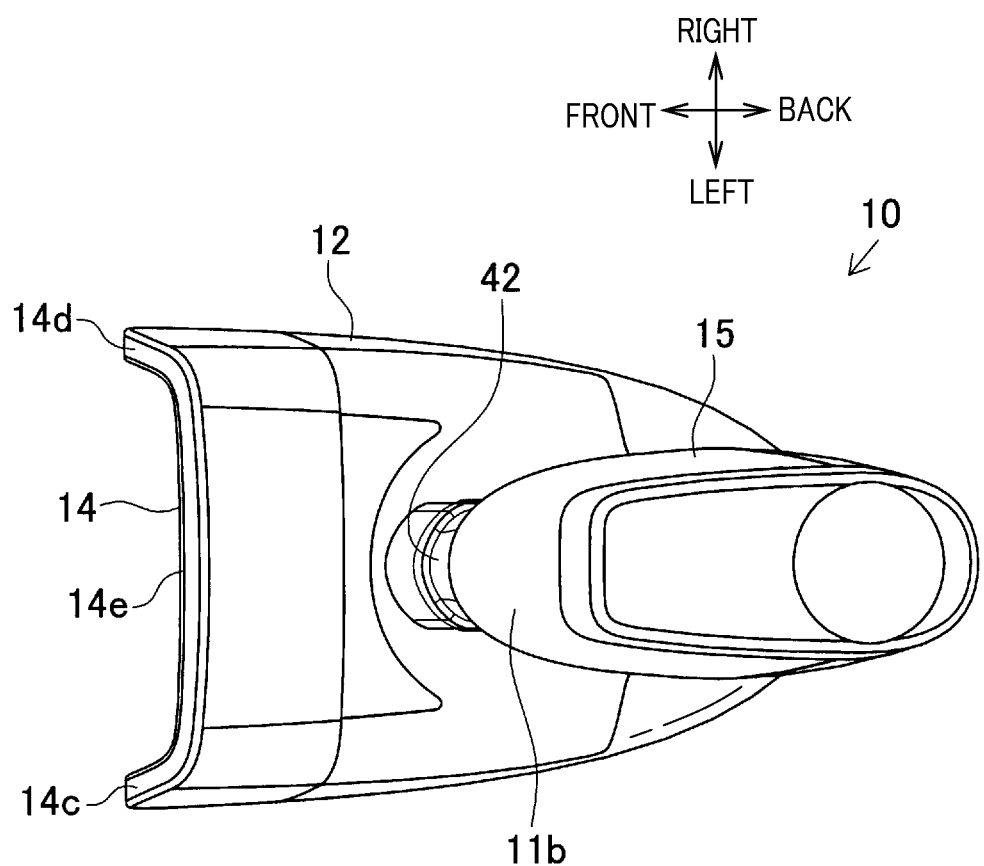
FIG. 6 is a bottom view of the optical information reader in FIG. 1.

As shown in FIG. 1 and FIG. 3, the reading opening 13 is configured to be open towards the front, with a substantially square shape, on the front side of the main body portion 12. In addition, the extending portion 14 is provided in the periphery of the reading opening 13. The extending portion 14 extends from a wall section forming the periphery of the reading opening 13 towards the front side of the main body portion 12. The extending portion 14 is set mainly for the purpose of securing a fixed distance from the reading opening 13 towards the front, when an information code is read. When the reader 10 is in use, the information code C is present such as to be in contact with, or separated from, the tip end of the extending portion 14.

The extending portion 14 has an opened portion 14a. When the user uses the reader 10 such that the tip end of the reader 10, that is, the tip end of the extending portion 14 faces the information code C, as described hereafter, the opened portion 14a functions as a defined gap or space portion for allowing a user's line-of-sight to pass. That is, the opened portion 14a allows the user to visually confirm the presence and/or the size of the information code.

Here, the structure of the extending portion 14 will be described in detail. The extending portion 14 is configured by an extending top wall portion 14b, extending side wall portions 14c and 14d, and an extending bottom wall portion 14e. In addition, the opened portion 14a is formed in the extending portion 14 in a section other than the section on the grip portion 15 side (in a section away from the grip portion 15). Specifically, the extending portion 14 has an eave-less structure or recessed ceiling structure in which the extending portion 14 is partially notched or cut out, from an edge on the upper front side thereof towards the lower backside. In the present embodiment, it can also be said that the opened portion 14a is made up of a partially recessed upper-side tip edge which is recessed backward or set back so that a space for a user's view is produced just in front of an information code C (refer to FIG. 10) when the information code C is read.

An inverse U-shaped section of the extending portion 14, when viewed from the front side, that is positioned further towards the back side than the opened portion 14a and extends towards the front side (the side facing the information code during use) of the main body portion 12 serves as the extending top wall portion 14b. Specifically, the extending top wall portion 14b is configured by a section that extends towards the front side of the main body portion 12 at the top side of the reading opening 13 (the upper-side section configuring the periphery of the reading opening 13) and above substantially center positions on both the left and right sides of the reading opening 13. In addition, the extending top wall portion 14b is configured at an angle so as to project towards the front as the front-side end portions (the upper side sections of the opened portion 14a) on both the left and right sides approach the lower side.

Figure 11:
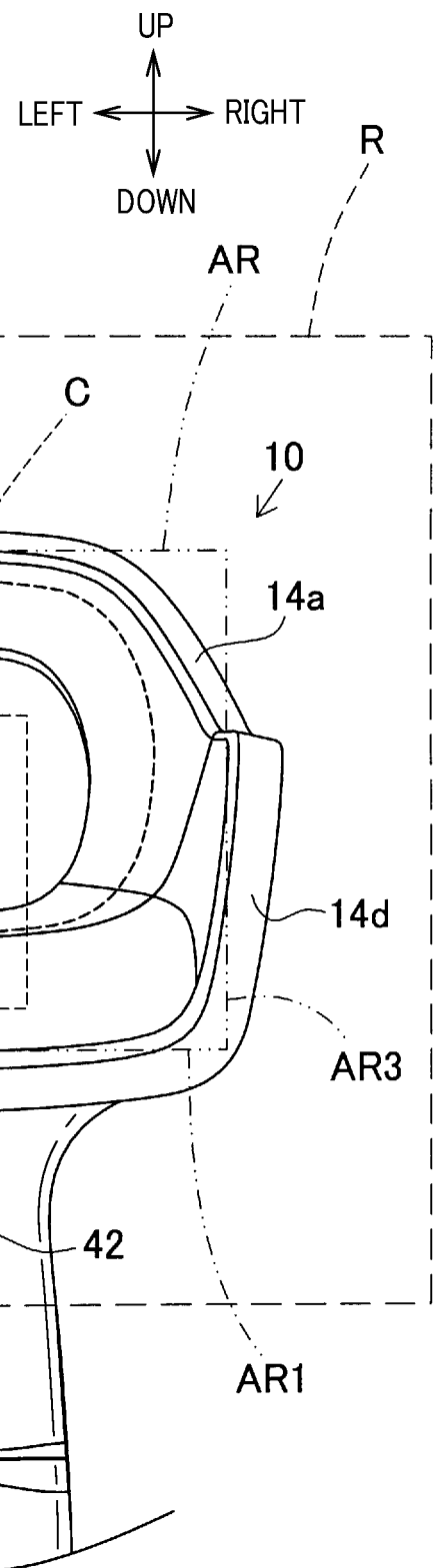
FIG. 11 is a front view schematically showing a portion of the optical information reader in the state shown in FIG. 10.

Furthermore, the section of the extending portion 14 on the grip portion 15 side serves as the extending bottom wall portion 14e. That is, the extending bottom wall portion 14e is configured to extend from the section at the bottom side of the reading opening 13 (the lower-side section configuring the periphery of the reading opening 13) towards the front side. The extending bottom wall portion 14e has a substantially rectangular shape with a plate surface that is perpendicular to the up/down direction. In addition, an end portion on the front side of the extending bottom wall portion 14e is formed such as to run along one edge of a predetermined cross-section of the imaging area of the light-receiving sensor 28. Specifically, as shown in FIG. 11, the end portion on the front side of the extending bottom wall portion 14e is configured to run along an edge AR1 on the lower side of a cross-section of an imaging area (or imaging field-of-view) AR. The cross-section is substantially perpendicular to the front/back direction. The imaging area is determined by a distance from the light-projection optical system of the main body portion 12. However, the imaging area AR referred to according to the present embodiment is an imaging field-of-view obtained at the position at the tip of the extending portion 14.

In addition, the extending bottom wall portion 14e is formed such that the length of the end portion on the front side thereof is substantially the same as the length of the edge AR1 of the imaging area AR. Specifically, the extending bottom wall portion 14e is formed such that the length of the extending bottom wall portion 14e in the direction along the periphery of the reading opening 13, that is, the length in the left/right direction (width direction) is substantially the same as the width of the imaging area of the light-receiving sensor 28 in the left/right direction.

Furthermore, the sections of the extending portion 14 that are connected in a substantially perpendicular to the extending bottom wall portion 14e serve as the extending side wall portions 14c and 14d. That is, the extending side wall portions 14c and 14d are configured to extend towards the front side of the main body portion 12, from sections that oppose each other with the reading opening 13 therebetween and are positioned further towards the grip portion 15 side than the opened portion 14a. More specifically, the extending side wall portions 14c and 14d are configured to extend towards the front side, in a substantially rectangular shape, in the sections of the periphery of the reading opening 13 that are further below the substantially center positions on both the left and right sides. In addition, the end portions on the front side of the extending side wall portions 14c and 14d are each formed such as to run along one edge of a predetermined cross-section of the imaging area of the light-receiving sensor 28. Specifically, as shown in FIG. 11, the end portions on the front side of the extending side wall portions 14c and 14d are configured to run along left and right edges AR2 and AR3 of a cross-section of the imaging area AR. The cross-section is perpendicular to the front/back direction. In addition, the respective lower end portions of the extending side wall portions 14c and 14d are connected to the extending bottom wall portion 14e. The extending side wall portions 14c and 14d are formed integrally with the extending bottom wall portion 14e.

Figure 9:
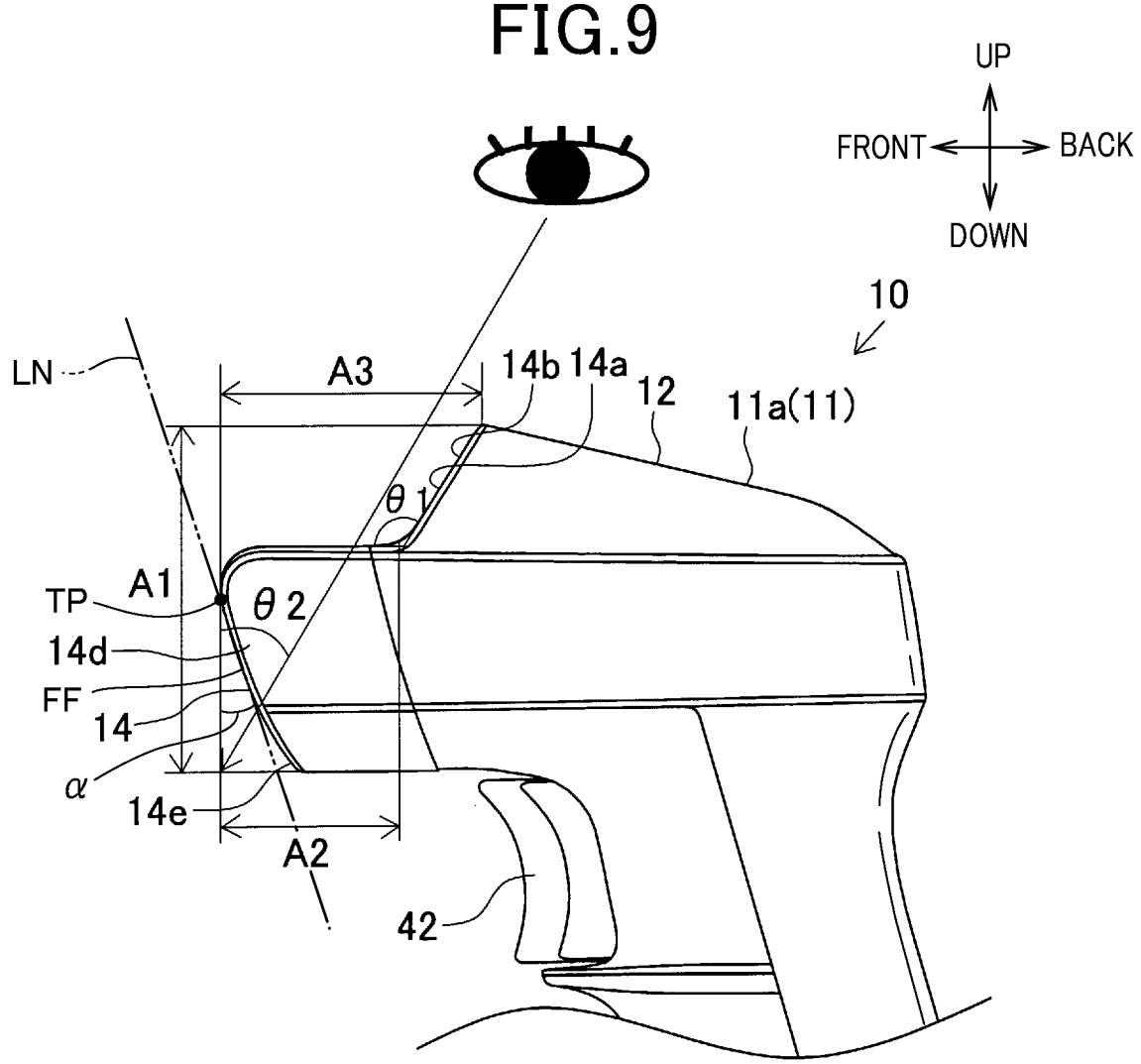
FIG. 9 is a right-side view for explaining a configuration near a reading opening of the optical information reader in FIG. 1.

Furthermore, as shown in FIG. 9, the extending side wall portions 14c and 14d each have a front surface FF that is a surface on the front side and opposing the display medium R (precisely a medium surface of the display medium R, which holds an information code thereon), in contact or with distance therebetween, during use. The front surface FF has a tapered surface that retracts towards the back at a fixed tilt angle $\alpha$, from a tip TP thereof towards the lower side. The tilt angle $\alpha$ can be prescribed as an angle formed by the front face FF and a normal line in the up/down direction that runs through the position of the tip TP. For example, the tilt angle $\alpha$ is about 12°. The tapered surface FF is made to come contact with the medium surface so that the extending direction of the extending portion 14 becomes oblique to the medium surface when a user tries to read the information code C by making the tip of the extending portion 14 touch the display medium R on which the information code C is attached. That its, the tapered surface is formed so that the optical system placed inside the main body portion 12 is not easily affected by specular reflection during use. The tilt angle $\alpha$ can be set to an appropriate value based on a geometric relationship of the optical system.

The extending side wall portions 14c and 14d correspond to an example of a "wall portion that is rigidly connected to a section of an extending portion on a grip portion side".

The opened portion 14a of the extending portion 14 is formed such that an opening length (i.e., cut-out width) in a direction (front/back direction) in which the reading opening 13 and an information code oppose each other increases as the opened portion 14a becomes farther away from the grip portion 15. That is, as shown in FIG. 9, a distance A3 is greater than a length A2. The distance A3 is the distance between a side of the extending top wall portion 14b on the upper side and the front-side end portion of the extending side wall portion 14c or 14d. The length A2 is the length by which the extending side wall portion 14c or 14d extends towards the front from the connecting section between the extending side wall portion 14c or 14d and the front-side end portion of the extending top wall portion 14b. As a result of a configuration such as this, an angle $\theta 1$ formed by the side of the extending side wall portion 14c or 14d in the upper-side end portion, and the side of the extending top wall portion 14b on the front-side end portion (the upper-side section of the opened portion 14a) becomes an obtuse angle.

In addition, the opened portion 14a of the extending portion 14 is configured such that the opening length in the front/back direction is at least one-half or longer, in relation to a distance between the section of the periphery of the reading opening 13 on the grip portion 15 side and the section opposite the section on the grip portion 15 side. For example, as shown in FIG. 9, the length A2 is one-half in relation to a distance A1 between the upper-side end portion of the extending top wall portion 14b and the front-side end portion of the extending bottom wall portion 14e.

Next, a reading operation of an information code performed by the reader 10 will be described.

To enable the reader 10 to reliably read the desired information code C (such as a Quick Response [QR] code [registered trademark]), as shown in FIG. 10, the reader 10 is placed near the display medium R. The information code C is formed in the display medium R. At this time, the opened portion 14a is formed in the extending portion 14 that is formed in the periphery of the reading opening 13. The opened portion 14a is formed in a section (a section on the upper front-side) away from the grip portion 15. Therefore, even when the extending side wall portions 14c and 14d come into contact with the display medium R, a gap (space) is formed between the display medium R and the extending portion 14 (more specifically, the opened portion 14a). Specifically, the display medium R and the extending top wall portion 14b are separated by a distance amounting to the length in the front/back direction of the extending side wall portions 14c and 14d. An opened section that is open on the upper side is formed by the display medium R, the extending side wall portions 14c and 14d, and the extending top wall portion 14b. Therefore, the user who is gripping the reader 10 is able to see the front side of the reading opening 13 from above, through the gap between the opened portion 14a of the extending portion 14 and the display medium R. As a result of the information code C formed in the display medium R being visible from the upper side in this way, the reader 10 can be moved to a desired position enabling the information code C to be easily read through the reading opening 13.

The respective front surfaces FF of the extending side wall portions 14c and 14d are tapered surfaces. Therefore, during the reading operation, the user can easily manually adjust the angle of the reader 10 that the user is gripping, such that a line LN along the tapered surface comes into contact with the display medium R, as in a reading state indicated by a virtual line R (LN) in FIG. 10. The tilt angle α of the tapered surface is set to enable prevention of specular reflection in the optical system, as described above. When specular reflection occurs, the control circuit 40 does not issue a command for completion of the reading operation. Therefore, the user waits for the command for completion of the reading operation while manually changing the angle of the extending portion 14 in relation to the display medium R. When the user manually changes the angle, the tapered surface can be used as an assisting means. The reading state indicated by the virtual line R (LN) in FIG. 10 can be easily achieved. As a result, a state in which reading is not possible due to specular reflection can be easily prevented.

Furthermore, as described above, the end portions of the extending side wall portions 14c and 14d on the information code C side (the front side) are each formed so as to run along an edge (edges AR2 and AR 3) of a predetermined cross-section of the imaging area AR of the light-receiving sensor 28. Therefore, as shown in FIG. 10, when the display medium R and the front-side end portions of the extending side wall portions 14c and 14d are placed opposing each other in proximity or in contact with each other, as shown in FIG. 11, the relative position of the information code C in the left/right direction in relation to the imaging area AR can be ascertained. That is, as shown in FIG. 11, the information code C can be fitted within the imaging area AR in the left/right direction, as a result of the reading opening 13 being arranged in relation to the information code C such that the left and right end portions of the information code C are fitted inside an area sandwiched between the front-side end portions of the extending side wall portions 14c and 14d. In addition, the left and right end portions of the information code C are placed so as to respectively run along the inner edges of the front-side end portions of the extending side wall portions 14c and 14d. As a result, the front-side end portions of the extending side wall portions 14c and 14d serve as indicators for maximizing use of the width of the imaging area AR in the left/right direction.

In addition, as described above, the end portion of the extending bottom wall portion 14e on the information code C side (the front side) is formed so as to run along an edge (edge AR1) of a predetermined cross-section of the imaging area AR of the light-receiving sensor 28. Therefore, when the display medium R and the front-side end portions of the extending side wall portions 14c and 14d are placed opposing each other in proximity or in contact with each other as shown in FIG. 10, the user gripping the reader 10 can view the end portion of the extending bottom wall portion 14e on the front side and the information code C from above, through the gap between the opened portion 14a of the extending portion 14 and the display medium R (see FIG. 9). As a result, the user can ascertain the relative position of the information code C to the imaging area AR. For example, when the user views the front of the reading opening 13 from above, at the angle θ2, as shown in FIG. 9, the user can fit the information code C within the imaging area AR by positioning the lower-side edge of the information code C slightly above the front-side end portion of the extending bottom wall portion 14e.

In addition, when the information code C is a barcode, for example, and the information code C is arranged such that the longitudinal direction thereof is the left/right direction, the barcode can be more easily read by being arranged on a reading line, such that the lower edge of the information code C is aligned in parallel to the front-side end portion of the extending bottom wall portion 14e.

As described above, the front-side end portions of the extending side wall portions 14c and 14d and the extending bottom wall portion 14e are each configured to extend along an edge of the imaging area AR of the light-receiving sensor 28. As a result, the imaging area AR of the reader 10 can be visually perceived by these wall portions 14c to 14e.

In addition, as shown in FIG. 9, described above, the length A2 is half the distance A1. Furthermore, the distance A3 is half the distance A1 or more. Here, the distance A1 is the distance between the extending top wall portion 14b and the extending bottom wall portion 14e. The length A2 is the length by which the extending side wall portion 14c or 14d extends towards the front from the connecting section between the extending side wall portion 14c or 14d and the front-side end portion of the extending top wall portion 14b. The distance A3 is the distance between the side of the extending top wall portion 14b on the upper side and the front-side end portion of the extending side wall portion 14c or 14d. Therefore, even when the display medium R and the extending side wall portions 14c and 14d come into contact (see FIG. 10), as shown in FIG. 9, the user is able to view the inside of the space formed in front of the reading opening 13 from above, at the angle θ2 (such as 25°) in relation to the display medium R.

Next, a case in which the information code C is read with the extending portion 14 placed in contact with the display medium R in which the information code C is formed will be described. The user moves the reader 10 such that the extending portion 14 is in contact with the information code C at an appropriate position (a position in which the information code C fits within the imaging area AR, as shown in FIG. 11), based on the above-described configuration. Subsequently, the user presses the trigger switch 42 and starts the reading process of the information code C. Here, the extending portion 14 is provided so as to extend towards the front of the reading opening 13. Therefore, the reading opening 13 can be placed away from the display medium R by the extension distance of the extending portion 13 towards the front. In a similar manner, the grip portion 15 can be placed away from the display medium R by the extension distance, as a result of the extending portion 14. The grip portion 15 is formed in the section of the main body unit 12 opposite the section in which the reading opening 13 is formed.

As a result, interference between the information code C or the display medium R, and the hand of the user gripping the grip portion 15 does not easily occur. For example, the pressing operation of the trigger switch 24 can be smoothly performed. That is, the reading operation performed by the user with the reader 10 is no longer hindered. As a result of a configuration such as this, even should the reader 10 be placed in a predetermined location such that the reading opening 13 is facing downward, for example, a gap is formed between the grip portion 15 and an installation surface as a result of the presence of the extending portion 14. Therefore, the user is able to grip the grip portion 15 and easily lift the reader 10.

As described above, according to the first embodiment, the extending portion 14 is provided in the periphery of the reading opening 13. The extending portion 14 extends from the wall section in the periphery of the reading opening 13 towards the front. The opened portion 14a is formed in the extending portion 14 in a section differing from the grip portion 15 side. Therefore, even when the reading opening 13 is placed near the information code C during reading of the information code C, the user is able to visually confirm the presence, size, and the like of the information code C through the gap or the space portion formed by the opened portion 14a of the extending portion 14. As a result, the user of the reader 10 can more easily confirm the position and the size of the information code C, through the gap formed by the opened portion 14a, and arrange the reader 10 in the desired position that facilitates reading of the information code C. In addition, a configuration such as this can be actualized without use of a specific shape or a specific material in the extending portion 14. Increase in the number of components can be suppressed, and simplification of the structure of the reader 10 can be achieved.

Furthermore, at least a portion of the end portion of the extending portion 14 on the information code C side is configured to run along an edge of the imaging area AR of the light-receiving sensor 28.

As a result of a configuration such as this, the relative position of the information code C to the reading opening 13 can be determined with reference to the position of the end portion of the extending portion 14 on the information code C that runs along an edge of the imaging area AR of the light-receiving sensor 28. The information code C can be more easily fitted within the imaging area AR. As a result, the reader 10 can more easily read the information code C, and the success rate of the reading operation can be improved.

In addition, the extending side wall portions 14c and 14d that are connected to the section of the extending portion 14 on the grip portion 15 side are configured such that the end portions thereof on the information code C side are each formed to run along an edge (AR2 and AR3) of the imaging area AR of the light-receiving sensor 28.

As a result of a configuration such as this, the relative position of the information code C to the reading opening 13 can be determined with reference to the end portions of the extending side wall portions 14c and 14d on the information code C side. The information code C can be more easily fitted within the imaging area AR. Furthermore, as a result of the information code C being positioned to run along the end portions of the extending side wall portions 14c and 14d on the information code C side, the information code C can be fitted within the imaging area AR so as to maximize use of the imaging area AR.

In addition, the section (extending bottom wall portion 14e) of the extending portion 14 on the grip portion 15 side is configured such that the end portion thereof on the information code C side is formed to run along an edge (AR1) of the imaging area AR of the light-receiving sensor 28.

As a result of a configuration such as this, the relative position of the information code C to the reading opening 13 can be determined with reference to the end portion of the extending bottom wall portion 14e on the information code C side. The information code C can be more easily fitted within the imaging area AR. Furthermore, as a result of the information code C being positioned to run along the end portion of the extending bottom wall portion 14e on the information code C side, the information code C can be fitted within the imaging area AR so as to maximize use of the imaging area AR.

In addition, the opened portion 14a of the extending portion is formed such that the length in the direction (front/back direction) in which the reading opening 13 and the information code C oppose each other increases as the opened portion 14a becomes farther away from the grip portion 15.

As a result of a configuration such as this, the opening length of the extending portion 14 increases as the opened portion 14a becomes farther away from the grip portion 15. The information code C becomes more easily visible from the side of the main body portion 12 opposite the grip portion 15 side. Meanwhile, the opened portion 14a of the extending portion 14a can more easily have a smaller opening length in the section near the grip portion 15. High strength can be maintained in the connecting section between the reading opening 13 and the extending portion 14.

Furthermore, the opened portion 14a is configured such that the opening length in the direction (front/back direction) in which the reading opening 13 and the information code C oppose each other is at least one-half or longer, in relation to the distance between the section of the periphery of the reading opening 13 on the grip portion 15 side and the section opposite the section on the grip portion 15 side.

As a result of a configuration such as this, the opening length of the opened portion 14a is configured to be a predetermined length or longer, in relation to the reading opening 13. Therefore, when the reading opening 13 is placed near the information code C, the minimum gap (space portion) required to enable viewing of the information code C through the opened portion 14a between the reading opening 13 and the information code C can be secured.

Other Embodiments

The present invention is not limited to the embodiment described above and with reference to the drawings. For example, the following embodiments are also included within the technical scope of the present invention.

According to the above-described first embodiment, an example is described of a configuration in which the extending portion 14 is notched towards the lower back side in the upper front side of the extending portion 14. However, as long as the configuration is such that the opened portion 14a is formed at least in a portion of the section (the section other than the extending bottom wall portion 14e) differing from the section on the grip portion 15 side, the extending portion 14 may be formed into other shapes.

Figure 12:
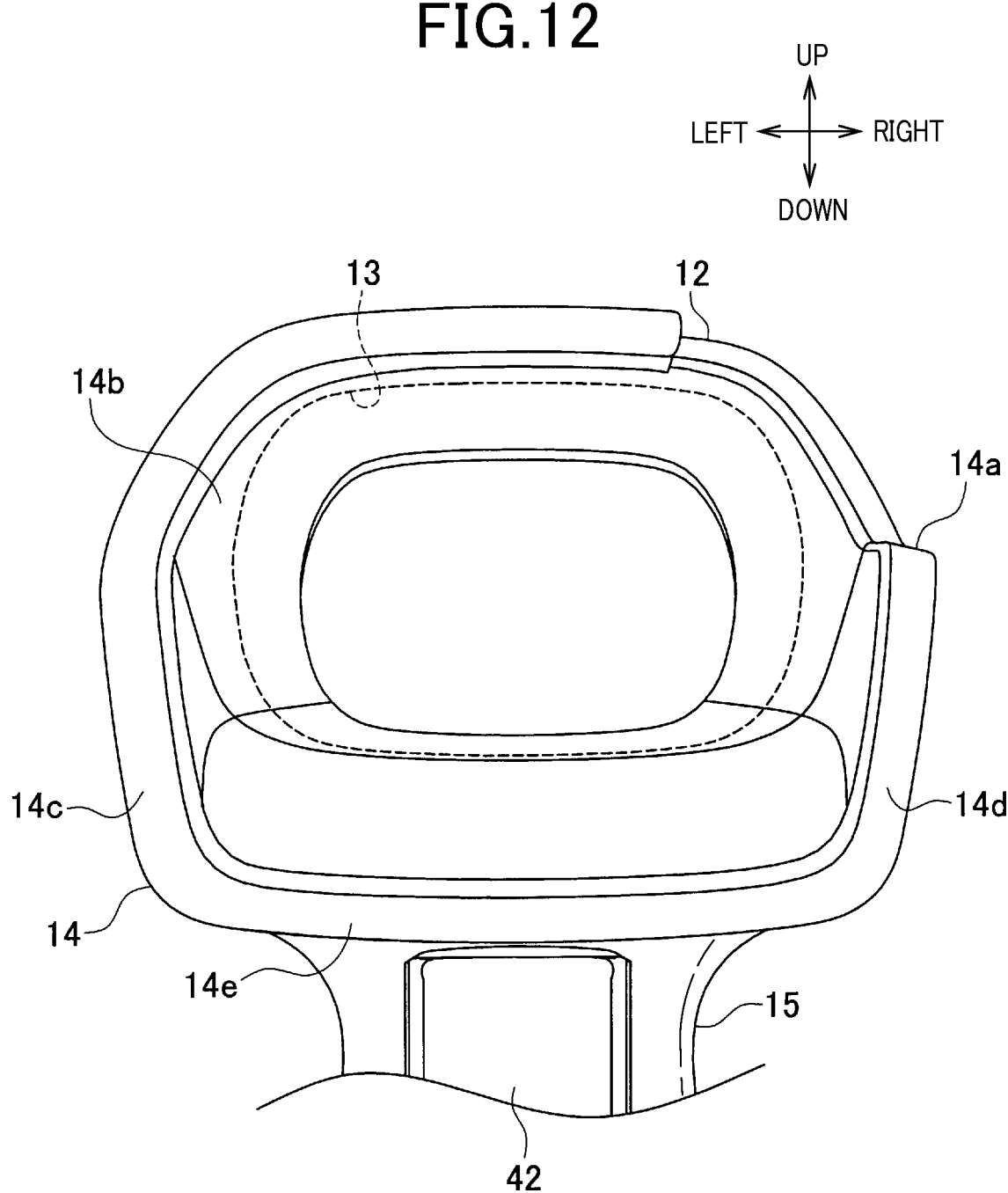
FIG. 12 is a front view schematically showing a portion of an optical information reader according to another embodiment of the present invention.

For example, as shown in FIG. 12, in the extending portion 14 that extends from the wall section in the periphery of the reading opening 13 towards the front side of the main body portion 12, a portion on the upper right may be notched. That is, the extending portion 14 is configured in an extending manner, excluding a portion of an upper right section of the reading opening 13 (an upper right section configuring the periphery of the reading opening 13).

In addition, as shown in FIG. 13, the extending portion 14 may be notched, excluding a section on the grip portion 15 side in the periphery of the reading opening 13. That is, the extending portion 14 is configured such that only the extending bottom wall portion 14e extends from the periphery of the reading opening 13. Furthermore, in a configuration such as this, the length of the front-side end portion of the extending bottom wall portion 14e may be formed to be substantially the same as the length of an edge (AR1), on the grip portion 15 side, of a predetermined cross-section of the imaging area AR of the light-receiving sensor 28. The user of the reader 10 can ascertain the width of the imaging area AR (the length of the edge on the grip portion 15 side) based on the length of the front-side end portion of the extending portion 14 on the grip portion 15 side. Therefore, the information code C can be more easily fitted within the imaging area AR. In addition, as a result of the end portions in the left/right direction on the lower edge of the information code C being matched to the end portions in the left/right direction in the front-side end portion of the extending bottom wall portion 14e, the extending bottom wall portion 14e serves as an indicator for maximizing use of the width of the imaging area AR in the left/right direction.

In addition, according to the above-described first embodiment, an example is described in which the extending side wall portions 14c and 14d are formed in the reading opening 13. However, a configuration in which either of the extending side wall portions 14c and 14d is formed is also possible. When the extending side wall portion 14c is formed, the end portion on the front side (the side facing the information code) thereof is formed running along an edge (edge AR2) of a predetermined cross-section of the imaging area AR of the light-receiving sensor 28. When the extending side wall portion 14d is formed, the end portion on the front side thereof is formed running along an edge (edge AR3) of a predetermined cross-section of the imaging area AR of the light-receiving sensor 28. Even in a configuration such as this, the reading opening 13 can be made to oppose the information code C at an appropriate position, with reference to either of the extending side wall portions 14c and 14d. In addition, as a result of the information code C being positioned to run along either of the extending side wall portions 14c and 14d, the width of the imaging area AR in the left/right direction can be used to the widest extent possible.

Figure 14:
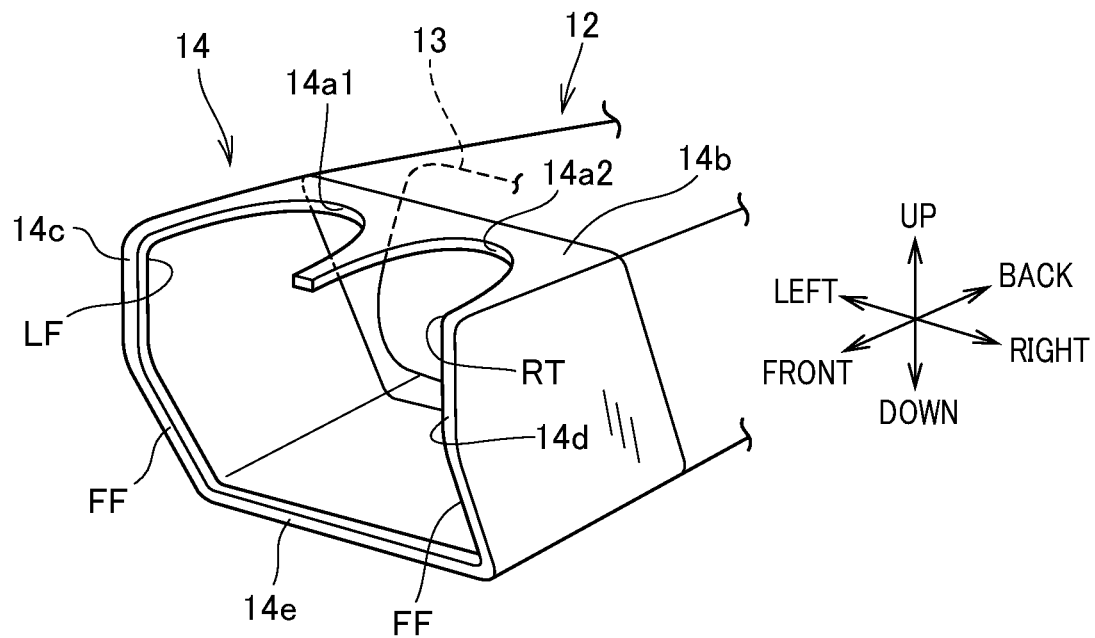
FIG. 14 is a partial perspective view for explaining a variation example of an opened portion formed in an extending portion.
Figure 15:
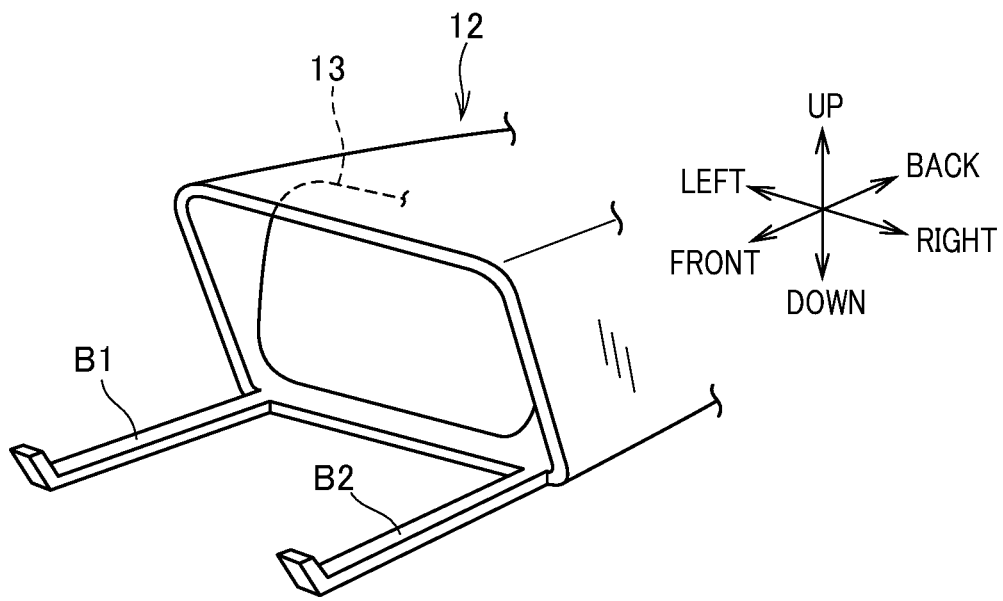
FIG. 15 is a partial perspective view for explaining a variation example of a configuration formed as an extending portion and providing an opened portion.

Furthermore, the opened portion 14a of the extending portion 14 described according to the above-described first embodiment can be further modified into various shapes and structures. FIG. 14 and FIG. 15 show typical variation examples of the opened portion 14a. The extending top wall portion 14b of the extending portion 14 shown in FIG. 1 and the like corresponds to a remaining section when the opened portion 14a is formed by a portion of the top wall and a portion of the left and right side walls of the extending portion 14 being notched or cut out from the tip end portions thereof. Numerous examples of the notch or the cut-out can be supposed. Typical examples thereof are shown in FIG. 14 and FIG. 15.

In the variation example shown in FIG. 14, a first opened portion 14a1 and a second opened portion 14a2 are formed in the extending top wall portion 14b of the extending portion 14. The first opened portion 14a1 and the second opened portion 14a2 are each formed by the extending top wall portion 14b being notched or cut out in a substantially semicircular shape from the tip end side to the back side thereof. The first and second opened portions 14a1 and 14a2 are arrayed in the left/right direction. In this configuration, a left-most end LF and a right-most end RT of the first and second opened portions 14a1 and 14a2 are preferably set to match the left and right ends of the imaging area (imaging field-of-view) AR, described above. A reason for this is to facilitate visual confirmation by the user of the presence and size of the information code C through the gap or space portion configured by the first and second opened portions 14a1 and 14a2.

In addition, in the variation example shown in FIG. 15, two bar-shaped members B1 and B2 form the extending portion 14. The two bar-shaped members B1 and B2 extend in the front/back direction from the bottom ends of the wall sections on the left and right of the reading opening 13. The two bar-shaped members B1 and B2 are composed of a resin, for example. The lengths of the two bar-shaped members B1 and B2 are set such that the imaging area AR of a certain size can be obtained, as described above. In the case of the two bar-shaped members B1 and B2, the top, bottom, left, and right planes, excluding the bars, are open. The open portions, particularly the upper-side space, provide the user with an opened portion for viewing the information code C.

Working effects identical to those achieved according to the above-described first embodiment can be achieved in the foregoing variation examples as well.

Furthermore, according to the above-described first embodiment, the section that is notched to form the opened portion 14a in the extending portion 14 may be covered by a transparent member. For example, a transparent member composed of a resin material or the like may be connected to the opened portion 14a, in a shape similar to the notched section of the extending portion 14. As a result of a configuration such as this, even when the reader 10 is placed near the information code C, the information code C can be viewed through the transparent member. Attachment of dust and the like to the reading opening 13 can be prevented. In addition, as a result of a soft, silicon material or the like being used in the transparent member, cushioning can be improved. Strength against impact can be enhanced.

Still further, in the reader 10 according to the above-described first embodiment, the protective plate 26 may be tilted such that the upper-side portion is tilted further towards the front than the lower-side portion, as indicated by a virtual line 26' in FIG. 7. As a result, the effect of specular reflection caused by the illumination light in the light-reception optical system can be more easily prevented. This variation example is also similarly applicable to the various variation examples described above, in addition to the first embodiment.

EXPLANATION OF REFERENCE NUMBERS

10: optical information reader
12: main body portion
13: reading opening
14: extending portion
14a, 14a1, 14a2: opened portion
14b: extending top wall portion
14c, 14d: extending side wall portion (wall portion)
14e: extending bottom wall portion
15: grip portion
28: light-receiving sensor (imaging unit)
40: control circuit (interpreting unit)
B1, B2: bar-shaped member providing an opened portion
AR: imaging area
C: information code
R: display medium

What is claimed is:

1. An optical information reader comprising:
a main body portion that includes a reading opening through which illumination light and reflected light of the illumination light are transmitted, the reading opening having a periphery, the illumination light and the reflected light being transmitted along front/back directions of the optical information reader;
a grip portion that is rigidly connected to a part of the main body portion which is positionally different from a part in which the reading opening is formed, the grip portion being configured to be gripped by a user;
an extending portion that extends forward from the periphery of the reading opening in front/back directions of the extending portion, the extending portion having a front opening; and
an imaging unit that has an imaging field of view and optically captures an image of the imaging field of view through the reading opening and through the front opening; and
wherein:
the extending portion is provided with a wall portion defining the front opening, and an opened portion, the wall portion including a top wall portion and side wall portions in up/down directions of the reader, the side wall portions having a front surface positioned to intersect the front/back directions,
the opened portion being formed as a partially cut opening of the top and side wall portions, the partially cut opening being partially cut from a tip end of the wall portion towards the main body portion, the front opening and the opened portion being contiguous with each other,
both the opened portion and the front opening allow a visual line-of-sight of the user to visually pass therethrough to a surface of a display medium on which the information code is arranged,
the imaging field of view is provided at the tip end of the wall portion, and
the front surface includes a tapered surface, the tapered surface being touchable to the surface of the display medium, the tapered surface being oblique to the front/back directions.

2. The optical information reader of claim 1, wherein the tip end of the wall portion includes at least a part which runs along one edge of the imaging field of view.

3. The optical information reader of claim 2, wherein the part of the tip end is substantially equal in length to the one edge of the imaging field of view.

4. The optical information reader of claim 2, wherein the partially cut opening is formed to have an opening length provided by the top wall portion in the front/back directions, the opening length becoming larger in an upward direction of the up/down directions of the reader in direct relationship to increasing distance from the grip portion in the upward direction of the up/down directions.

5. The optical information reader of claim 2, wherein the extending portion has the opened portion formed to have a length provided in the front/back directions, the length being one-half or longer than a length of the extending portion provided in the up/down directions.

6. The optical information reader of claim 5, wherein the opened portion is composed of one or more opened portions formed by partially cutting the wall portion from the tip end thereof.

7. The optical information reader of claim 2, wherein the opened portion is composed of one or more opened portions formed by partially cutting the wall portion from the tip end thereof.

8. The optical information reader of claim 1, wherein the partially cut opening is formed to have an opening length provided by the top wall portion in the front/back directions, the opening length becoming larger in an upward direction of the up/down directions of the reader in direct relationship to increasing distance from the grip portion in the upward direction of the up/down directions.

9. The optical information reader of claim 1, wherein the extending portion has the opened portion formed to have a length provided in the front/back directions, the length being one-half or longer than a length of the extending portion provided in the up/down directions.

10. The optical information reader of claim 1, wherein the opened portion is composed of one or more opened portions formed by partially cutting the wall portion from the tip end thereof.

11. The optical information reader of claim 1, wherein the side wall portions are formed to define the front surface.

12. The optical information reader of claim 1, wherein the tip end of the wall portion has side edges which are located in the front/back directions and run in the up/down directions of the reader, and the front surface is formed to be continuous from the side edges.

13. The optical information reader of claim 1, further comprising
an interpreting unit that performs an information code interpreting process based on the image of the imaging field of view, the interpreting unit being accommodated in the grip portion.

* * * * *